United States Patent
Pramod et al.

(10) Patent No.: US 10,988,655 B2
(45) Date of Patent: Apr. 27, 2021

(54) COMPOSITION FOR THERMAL STORAGE AND HEAT TRANSFER APPLICATIONS

(71) Applicant: HINDUSTAN PETROLEUM CORPORATION LTD., Mumbai (IN)

(72) Inventors: Kandoth Madathil Pramod, Bangalore (IN); Kanaparthi Ramesh, Bangalore (IN); Peddy Venkat Chalapathi Rao, Bangalore (IN); Nettem Venkateswarlu Choudary, Bangalore (IN)

(73) Assignee: HINDUSTAN PETROLEUM CORPORATION LTD., Mumbai (IN)

( * ) Notice: Subject to any disclaimer, the term of this patent is extended or adjusted under 35 U.S.C. 154(b) by 195 days.

(21) Appl. No.: 15/511,500

(22) PCT Filed: Jun. 17, 2016

(86) PCT No.: PCT/IN2016/050188
§ 371 (c)(1),
(2) Date: Mar. 15, 2017

(87) PCT Pub. No.: WO2016/203498
PCT Pub. Date: Dec. 22, 2016

(65) Prior Publication Data
US 2017/0283676 A1    Oct. 5, 2017

(30) Foreign Application Priority Data
Jun. 19, 2015 (IN) .......................... 2352/MUM/2015

(51) Int. Cl.
*C09K 5/12*    (2006.01)
*C09K 5/06*    (2006.01)
(Continued)

(52) U.S. Cl.
CPC ................ *C09K 5/12* (2013.01); *C09K 5/063* (2013.01); *F24S 80/20* (2018.05); *C09K 5/08* (2013.01); *C09K 5/14* (2013.01); *Y02E 10/40* (2013.01)

(58) Field of Classification Search
CPC .... C09K 5/12; C09K 5/08; C09K 5/14; F24S 80/20; Y02E 10/40
(Continued)

(56) References Cited

U.S. PATENT DOCUMENTS 2,211,047 A * 8/1940 Beck ........................ C09K 5/12
                                                            252/71
3,490,966 A    1/1970 Hiltz
(Continued)

FOREIGN PATENT DOCUMENTS

CN    1142235 C       3/2004
CN    103289653 A *   9/2013
(Continued)

OTHER PUBLICATIONS

Derwent abstract CN 102433104A, published May 2012 (Year: 2012).*
(Continued)

*Primary Examiner* — Jane L Stanley
(74) *Attorney, Agent, or Firm* — Seed IP Law Group LLP

(57) ABSTRACT

In accordance with the present subject matter there is provided a composition including at least one nanoparticle, at least one alkali metal salt and a metal salt having water of crystallization. The subject matter also relates to a method for preparation of the composition.

18 Claims, 5 Drawing Sheets

(51) Int. Cl.
*F24S 80/20* (2018.01)
*C09K 5/08* (2006.01)
*C09K 5/14* (2006.01)

(58) Field of Classification Search
USPC .................................................. 252/70, 71
See application file for complete search history.

(56) References Cited

U.S. PATENT DOCUMENTS

| | | | |
|---|---|---|---|
| 7,588,694 | B1 | 9/2009 | Bradshaw et al. |
| 7,828,990 | B1 | 11/2010 | Cordaro et al. |
| 2010/0038581 | A1 | 2/2010 | Gladen et al. |
| 2014/0084205 | A1 | 3/2014 | Singh et al. |
| 2015/0376487 | A1* | 12/2015 | Zeng ................. C09K 5/12 252/71 |
| 2017/0283674 | A1 | 10/2017 | Ramesh et al. |

FOREIGN PATENT DOCUMENTS

| | | |
|---|---|---|
| CN | 102 433 104 B | 6/2014 |
| DE | 10 2011 083 735 A1 | 4/2013 |
| DE | 10 2012 211 917 A1 | 1/2014 |
| WO | 2012/107834 A1 | 8/2012 |
| WO | 2016/189550 A1 | 12/2016 |
| WO | 2016/203498 A1 | 12/2016 |

OTHER PUBLICATIONS

Derwent abstract DE 102012211917 A1 published Jan. 2014 (Year: 2014).*
Derwent abstract DE 102011083735 A1 published Apr. 2013 (Year: 2013).*
Derwent abstract of CN 103289653 A, to Liu et al. published Sep. 2013 (Year: 2013).*
Machine translation, EPO, of CN 103289653 A to Liu et al. published Sep. 2013 (Year: 2013).*
Derwent Abstract of CN 104087254 A to Liu et al., published Oct. 8, 2014 (Year: 2014).*
Machine translation of CN 104087254 A to Liu et al., published Oct. 8, 2014. Translation by EPO. (Year: 2014).*
Derwent abstract WO 2016074092A1 to Bannari et al. May 2016 (Year: 2016).*
Shin et al., "Specific Heat of Nanofluids Synthesized by Dispersing Alumina Nanoparticles in Alkali Salt Eutectic," *International Journal of Heat and Mass Transfer* 74:210-214, 2014.
International Search Report, dated Sep. 23, 2016, for PCT/IN2016/050188, 4 pages.
Written Opinion, dated Sep. 23, 2016, for PCT/IN2016/050188, 6 pages.
International Search Report, dated Sep. 12, 2016, for PCT/IN2016/050154, 3 pages.
Written Opinion, dated Sep. 12, 2016, for PCT/IN2016/050154, 6 pages.
R. Etefagh et al., "Synthesis of CuO nanoparticles and fabrication of nanostructural layer biosensors for detecting Aspergillus niger fungi," *Scientia Iranica, Transactions F: Nanotechnology* (2013) 20 (3), 1055-1058.
Yumei Tian et al., "Synthesis of amorphous $MoS_2$ nanospheres by hydrothermal reaction," *Materials Letters* 60 (2006), 527-529.
Fazel Yavari et al., "Enhanced Thermal Conductivity in a Nanostructured Phase Change Composite due to Low Concentration Graphene Additives," *J. Phys. Chem. C* 2011, 115, 8753- 8758.

* cited by examiner

COMPOSITION FOR THERMAL STORAGE AND HEAT TRANSFER APPLICATIONS

TECHNICAL FIELD

The subject matter described herein in general relates to a composition comprising at least one nanoparticle, at least one alkali metal salt and a metal salt having water of crystallization. The subject matter also relates to a method for preparation of the composition. The composition can be used in concentrated solar power (CSP) plant as solar thermal energy storage materials as well as heat transfer fluids.

BACKGROUND

Global warming is one of the major current environmental issues, which is caused by release of greenhouse gases in the environment. Increased consumption of energy from conventional fossil fuels in the last decades has led to the release of greenhouse gases which could adversely affect the climate. To reduce the impact of climate change due to global warming, current energy research is intensively focusing towards the effective utilization of most abundant energy source available, nothing but solar energy to save the environment from green-house producing fossil fuels and also to provide energy security. Considering solar energy, no investment is required for the source and the main cost is related with the thermal storage system for storing solar thermal energy for sufficient time period.

Solar thermal energy storage is a key element for the improvisation of the efficiency of thermal energy utilization because large scale solar energy production demands a wider storage capacity. High temperature thermal energy storage systems can deal with a wide range of temperatures and concentrated solar power (CSPs) applications and have greater potential in terms of technology as well as economy. The solar thermal energy can be stored in the molten salt media from where the heat energy is transferred to water for thermal operations such as high-power steam generation in solar power plants.

Fazel Yavari et al (Journal of Physical Chemistry C; 2011, 115, 8753-8758) have reported thermal conductivity enhancement of organic phase change materials by the addition of graphene nanoparticles. Donghyun Shin et al. reported (International Journal of Heat and Mass Transfer; 2014, 74 210-214) specific heat capacity enhancement of lithium carbonate-potassium carbonate salt eutectic by the addition of alumina nanoparticles. In this paper the authors initially made salt eutectic and added nanoparticle externally and add extra water and sonicated for 200 minute and finally evaporated the water to form salt-nanofluid. This consists of multiple steps and takes more time for the synthesis.

US20140084205 discloses an invention of nanoparticle coated phase change material as heat transfer and heat storage applications. The aforementioned document specifically discloses $Sn/SiO_2$ incorporated phase change material to enhance the thermal conductivity of organic heat transfer fluid.

SUMMARY

The present disclosure relates to a method for preparation of a composition, the method comprising the steps of (a) contacting at least one nanoparticle with at least one alkali metal salt and a metal salt having water of crystallization to obtain a mixture; (b) subjecting the mixture to a temperature in the range of 100-200° C. in a closed system to obtain a mixture of salts containing dispersed nanoparticles; and (c) removing water from the mixture of salts containing dispersed nanoparticles to obtain the composition. The present disclosure relates to a composition comprising of (a) at least one nanoparticle (b) at least one alkali metal salt; and (c) a metal salt having water of crystallization, wherein the composition has a melting temperature in the range of 100-150° C.

These and other features, aspects and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
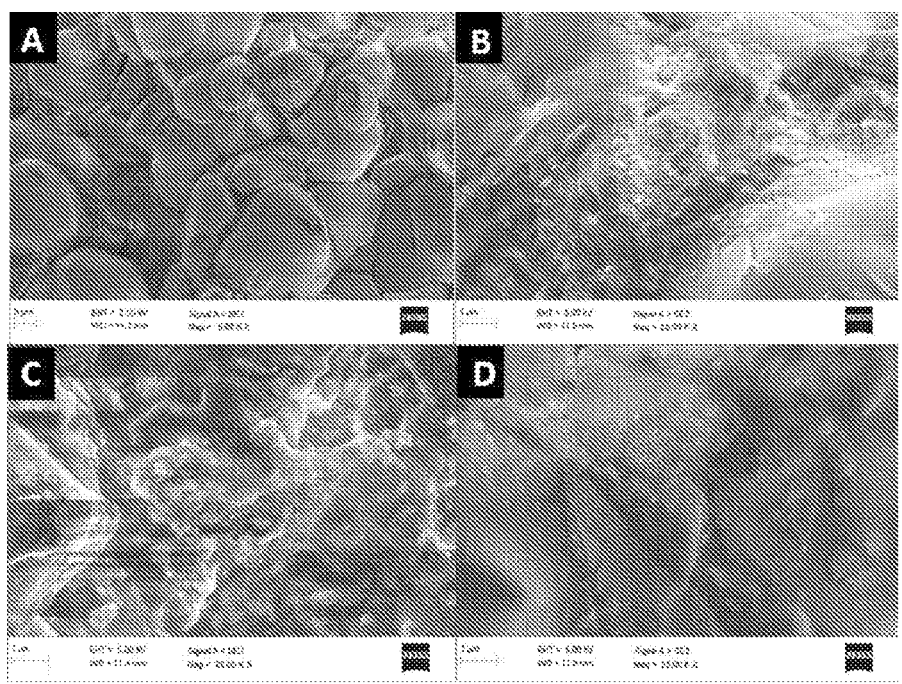
FIG. 1 depicts scanning electron microscopy (SEM) images of HPHTF-A and nanoparticle incorporated salt in different compositions.

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "water of crystallization" or "water of hydration" refers to water that occurs inside the crystals.

The term "HPHTF" is Hindustan Petroleum High Temperature Fluid.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 100° C. to about 200° C. should be interpreted to include not only the explicitly recited limits of about 100° C. to about 200° C., but also to include sub-ranges, such as 105° C. to 115° C., 150° C. to 170° C., and so forth, as well as individual amounts, including fractional amounts, within the specified ranges, such as 100.2° C., 101.6° C., and 102.3° C., for example.

The present disclosure provides a cost-effective preparation method of nanoparticles dispersed in molten salt mixture for thermal energy storage such as solar thermal applications that can be used in concentrated solar power (CSP) plant as solar thermal energy storage materials as well as heat transfer fluids. For solar thermal energy storage materials, the important materials requirements are high energy density, high heat transfer efficiency, good thermal stability, good cycle stability, non-corrosive behaviour, non-toxic, availability and cost-effectiveness. The present disclosure relates to a method for preparation of a composition, method comprising the steps of (a) contacting at least one nanoparticle with at least one alkali metal salt and a metal salt having water of crystallization to obtain a mixture; (b) subjecting the mixture to a temperature of in the range of 100-200° C. in a closed system to obtain a mixture of salts containing dispersed nanoparticles; and (c) removing water from the mixture of salts containing dispersed nanoparticles to obtain the composition. The method for preparation of the composition is cost effective. Molten salt based thermal energy storage received much attention due to the availability and low cost of molten salt, high thermal stability and thermal conductivity compared to the organic based thermal storage fluids, low viscosity at high temperature etc. Moderate thermal conductivity and low specific heat capacity of molten salts are enhanced by the addition of metallic and non-metallic nanoparticles.

The composition of the present disclosure have melting point less than 150° C. and thermal stability above 500° C. without compromising the thermo-physical properties like thermal conductivity, specific heat capacity and flow properties in molten state. The present disclosure relates to a composition comprising of (a) at least one nanoparticle; (b) at least one alkali metal salt; and (c) a metal salt having water of crystallization, wherein the composition has a melting temperature in the range of 100 to 150° C.

In one implementation, the composition includes: (a) at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof; (b) at least one alkali metal salt; and (c) a metal salt having water of crystallization, wherein the composition has a melting temperature in the range of 100 to 150° C.

In one implementation, the composition includes: (a) 0.01 to 2 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof; (b) at least one alkali metal salt; and (c) a metal salt having water of crystallization, wherein the composition has a melting temperature in the range of 100 to 150° C.

In one implementation, the composition includes: (a) at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof, wherein the at least one nanoparticle has a particle size in the range of 30 to 500 nm: (b) at least one alkali metal salt; and (c) a metal salt having water of crystallization, wherein the composition has a melting temperature in the range of 100 to 150° C.

In one implementation, the composition includes: (a) 0.01 to 2 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof, wherein the at least one nanoparticle has a particle size in the range of 30 to 500 nm; (b) at least one alkali metal salt; and (c) a metal salt having water of crystallization, wherein the composition has a melting temperature in the range of 100 to 150° C.

In one implementation, the composition includes: (a) 0.01 to 1 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof, wherein the at least one nanoparticle has a particle size in the range of 30 to 500 nm; (b) at least one alkali metal salt; and (c) a metal salt having water of crystallization, wherein the composition has a melting temperature in the range of 100 to 150° C.

In one implementation, the composition includes: (a) 0.01 to 0.9 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof, wherein the at least one nanoparticle has a particle size in the range of 30 to 500 nm; (b) at least one alkali metal salt; and (c) a metal salt having water of crystallization, wherein the composition has a melting temperature in the range of 100 to 150° C.

In one implementation, the composition includes: (a) 0.01 to 0.5 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof, wherein the at least one nanoparticle has a particle size in the range of 30 to 500 nm; (b) at least one alkali metal salt; and (c) a metal salt having water of crystallization, wherein the composition has a melting temperature in the range of 100 to 150° C.

In another implementation, the composition includes: (a) at least one nanoparticle; (b) at least one alkali metal salt selected from the group consisting of lithium metal salt, potassium metal salt, and combinations thereof; and (c) a metal salt having water of crystallization, wherein the composition has a melting temperature in the range of 100 to 150° C.

In one implementation, the composition includes: (a) at least one nanoparticle; (b) at least one alkali metal salt selected from the group consisting of lithium salt of inorganic anions, sodium salt of inorganic anions, potassium salt of inorganic anions, and combinations thereof; and (c) a metal salt having water of crystallization, wherein the composition has a melting temperature in the range of range of 100 to 150° C.

In another implementation, the composition includes: (a) at least one nanoparticle; (b) 5 to 90 wt % at least one alkali metal salt selected from the group consisting of lithium metal salt, potassium metal salt, and combinations thereof; and (c) a metal salt having water of crystallization, wherein the composition has a melting temperature in the range of 100 to 150° C.

In one implementation, the composition includes: (a) at least one nanoparticle; (b) 5 to 90 wt % at least one alkali metal salt selected from the group consisting of lithium salt of inorganic anions, sodium salt of inorganic anions, potassium salt of inorganic anions, and combinations thereof; and (c) a metal salt having water of crystallization, wherein the composition has a melting temperature in the range of range of 100 to 150° C.

In yet another implementation, the composition includes: (a) at least one nanoparticle; (b) at least one alkali metal salt, wherein the at least one alkali metal salt is a combination of lithium and potassium nitrate; and (c) a metal salt having water of crystallization, wherein the composition has a melting temperature in the range of range of 100 to 150° C.

In yet another implementation, the composition includes: (a) at least one nanoparticle; (b) at least one alkali metal salt, wherein the at least one alkali metal salt is a combination of 60 to 70 wt % potassium nitrate and 5 to 20 wt % lithium nitrate; and (c) a metal salt having water of crystallization, wherein the composition has a melting temperature in the range of range of 100 to 150° C.

In yet another implementation, the composition includes: (a) at least one nanoparticle; (b) at least one alkali metal salt; and (c) a metal salt having water of crystallization selected from the group consisting of alkali metal salt, alkaline earth metal salt, and transition metal salt, wherein the composition has a melting temperature in the range of 100 to 150° C.

In yet another implementation, the composition includes: (a) at least one nanoparticle; (b) at least one alkali metal salt; and (c) 10 to 35 wt % metal salt having water of crystallization selected from the group consisting of alkali metal salt, alkaline earth metal salt, and transition metal salt, wherein the composition has a melting temperature in the range of 100 to 150° C.

In yet another implementation, the composition includes: (a) at least one nanoparticle; (b) at least one alkali metal salt; and (c) a metal salt having water of crystallization, wherein the metal salt is 10 to 35 wt % hydrated calcium carbonate, wherein the composition has a melting temperature in the range of 100 to 150° C.

In yet another implementation, the composition includes: (a) 0.01 to 2 wt % of molybdenum disulfide; (b) a combination of 60 to 70 wt % potassium nitrate and 5 to 20 wt % lithium nitrate; and (c) 10 to 35 wt % hydrated calcium carbonate, wherein the composition has a melting temperature in the range of 100 to 150° C.

In yet another implementation, the composition includes: (a) 0.01 to 1 wt % of molybdenum disulfide; (b) a combination of 60 to 70 wt % potassium nitrate and 5 to 20 wt % lithium nitrate; and (c) 10 to 35 wt % hydrated calcium carbonate, wherein the composition has a melting temperature in the range of 100 to 150° C.

In yet another implementation, the composition includes: (a) 0.01 to 0.9 wt % of molybdenum disulfide; (b) a combination of 60 to 70 wt % potassium nitrate and 5 to 20 wt % lithium nitrate; and (c) 10 to 35 wt % hydrated calcium carbonate, wherein the composition has a melting temperature in the range of 100 to 150° C.

In yet another implementation, the composition includes: (a) 0.01 to 0.5 wt % of molybdenum disulfide; (b) a combination of 60 to 70 wt % potassium nitrate and 5 to 20 wt % lithium nitrate; and (c) 10 to 35 wt % hydrated calcium carbonate, wherein the composition has a melting temperature in the range of 100 to 150° C.

In yet another implementation, the composition includes: (a) 0.01 to 2 wt % of cupric oxide; (b) a combination of 60 to 70 wt % potassium nitrate and 5 to 20 wt % lithium nitrate; and (c) 10 to 35 wt % hydrated calcium carbonate, wherein the composition has a melting temperature in the range of 100 to 150° C.

In yet another implementation, the composition includes: (a) 0.01 to 2 wt % of carbon nanotubes; (b) a combination of 60 to 70 wt % potassium nitrate and 5 to 20 wt % lithium nitrate; and (c) 10 to 35 wt % hydrated calcium carbonate, wherein the composition has a melting temperature in the range of 100 to 150° C.

In yet another implementation, the composition includes: (a) 0.01 to 2 wt % of functionalized carbon nanotubes; (b) a combination of 60 to 70 wt % potassium nitrate and 5 to 20 wt % lithium nitrate; and (c) 10 to 35 wt % hydrated calcium carbonate, wherein the composition has a melting temperature in the range of 100 to 150° C.

In yet another implementation, the composition includes: (a) 0.01 to 2 wt % of multi-walled carbon nanotubes; (b) a combination of 60 to 70 wt % potassium nitrate and 5 to 20 wt % lithium nitrate; and (c) 10 to 35 wt % hydrated calcium carbonate, wherein the composition has a melting temperature in the range of 100 to 150° C.

In yet another implementation, the composition includes: (a) 0.01 to 2 wt % of activated carbon; (b) a combination of 60 to 70 wt % potassium nitrate and 5 to 20 wt % lithium nitrate; and (c) 10 to 35 wt % hydrated calcium carbonate, wherein the composition has a melting temperature in the range of 100 to 150° C.

In yet another implementation, the composition includes: (a) 0.01 to 2 wt % of activated carbon spheres; (b) a combination of 60 to 70 wt % potassium nitrate and 5 to 20 wt % lithium nitrate; and (c) 10 to 35 wt % hydrated calcium carbonate, wherein the composition has a melting temperature in the range of 100 to 150° C.

In yet another implementation, the composition includes: (a) 0.01 to 2 wt % of graphene; (b) a combination of 60 to 70 wt % potassium nitrate and 5 to 20 wt % lithium nitrate; and (c) 10 to 35 wt % hydrated calcium carbonate, wherein the composition has a melting temperature in the range of 100 to 150° C.

As described above, the present disclosure relates to a method for preparation of a composition. In one implementation, the method for preparation of a composition includes the steps of: (a) contacting at least one nanoparticle with at least one alkali metal salt and a metal salt having water of crystallization to obtain a mixture; (b) subjecting the mixture to a temperature of in the range of 100 to 200° C. in a closed system to obtain a mixture of salts containing dispersed nanoparticles; and (d) removing water from the mixture of salts containing dispersed nanoparticles to obtain the composition.

In one implementation, the method for preparation of a composition includes the steps of: (a) contacting at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with at least one alkali metal salt and a metal salt having water of crystallization to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition.

In one implementation, the method for preparation of a composition includes the steps of: (a) contacting 0.01 to 2 wt % at least one nanoparticle with at least one alkali metal salt and a metal salt having water of crystallization to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition.

In one implementation, the method for preparation of a composition includes the steps of: (a) contacting 0.01 to 1 wt % at least one nanoparticle with at least one alkali metal salt and a metal salt having water of crystallization to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition.

In one implementation, the method for preparation of a composition includes the steps of: (a) contacting 0.01 to 0.9 wt % at least one nanoparticle with at least one alkali metal salt and a metal salt having water of crystallization to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition.

In one implementation, the method for preparation of a composition includes the steps of: (a) contacting 0.01 to 0.5 wt % at least one nanoparticle with at least one alkali metal salt and a metal salt having water of crystallization to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition.

In one implementation, the method for preparation of a composition includes the steps of: (a) contacting at least one nanoparticle with at least one alkali metal salt selected from the group consisting of lithium metal salt, sodium metal salt, potassium metal salt, and combinations thereof and a metal salt having water of crystallization to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition.

In one implementation, the method for preparation of a composition includes the steps of: (a) contacting at least one nanoparticle with at least one alkali metal salt selected from the group consisting of lithium salt of inorganic anions, sodium salt of inorganic anions, potassium salt of inorganic anions, and combinations thereof and a metal salt having water of crystallization to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition.

In one implementation, the method for preparation of a composition includes the steps of: (a) contacting at least one nanoparticle with at least one alkali metal salt and a metal salt having water of crystallization to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition, wherein the at least one alkali metal salt weight percentage in the composition is in the range of 5 to 90%.

In one implementation, the method for preparation of a composition includes the steps of: (a) contacting at least one nanoparticle with at least one alkali metal salt and a metal salt having water of crystallization to obtain a mixture, wherein the at least one alkali metal salt is a combination of lithium and potassium nitrate; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition.

In one implementation, the method for preparation of a composition includes the steps of: (a) contacting at least one nanoparticle with at least one alkali metal salt and a metal salt having water of crystallization to obtain a mixture, wherein the at least one alkali metal salt is a combination of lithium and potassium nitrate; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition, wherein potassium nitrate weight ratio in the composition is in the range of 60 to 70% and lithium nitrate weight percentage in the composition is in the range of 5 to 20%.

In one implementation, the method for preparation of a composition includes the steps of: (a) contacting at least one nanoparticle with at least one alkali metal salt and a metal salt having water of crystallization selected from the group consisting of alkali metal salt, alkaline earth metal salt, and transition metal salt to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition.

In one implementation, the method for preparation of composition includes the steps of: (a) contacting at least one nanoparticle with at least one alkali metal salt and a metal salt having water of crystallization and melting point in the range of 100 to 150° C. to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition.

In one implementation, the method for preparation of a composition includes the steps of: (a) contacting at least one nanoparticle with at least one alkali metal salt and a metal salt having water of crystallization to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition, wherein the metal salt having water of crystallization weight percentage in the composition is in the range of 10 to 35%.

In one implementation, the method for preparation of a composition includes the steps of: (a) contacting at least one nanoparticle with at least one alkali metal salt and a metal salt having water of crystallization to obtain a mixture; (b) subjecting the mixture to a temperature of in the range of 100 to 200° C. in a closed system to obtain a mixture of salts containing dispersed nanoparticles; and (c) removing water from the mixture of salts containing dispersed nanoparticles to obtain the composition, wherein the composition has a moisture content in the range 3 to 13 wt %.

In one implementation, the method for preparation of composition includes the steps of: (a) contacting at least one nanoparticle with at least one alkali metal salt and a metal salt having water of crystallization to obtain a mixture; (b) subjecting the mixture to a temperature of 100 to 200° C. for 0.5 to 2 h in a closed system to obtain a mixture of salts containing dispersed nanoparticles; and (c) removing water from the mixture of salts containing dispersed nanoparticles to obtain the composition.

In one implementation, the method for preparation of composition includes the steps of: (a) contacting at least one nanoparticle with at least one alkali metal salt and a metal salt having water of crystallization to obtain a mixture; (b) subjecting the mixture to a temperature of 100 to 200° C. in a closed system at a pressure in the range of 1.0 to 3 bars to obtain a mixture of salts containing dispersed nanoparticles; and (c) removing water from the mixture of salts containing dispersed nanoparticles to obtain the composition.

In one implementation, the method for preparation of composition includes the steps of: (a) contacting at least one nanoparticle with at least one alkali metal salt and a metal salt having water of crystallization to obtain a mixture; (b) subjecting the mixture to a temperature of 100 to 200° C. in a closed system to obtain a mixture of salts containing dispersed nanoparticles; and (c) removing water from the mixture of salts containing dispersed nanoparticles to obtain the composition, wherein the composition has a melting temperature in the range of 100 to 150° C.

In one implementation, the method for preparation of composition includes the steps of: (a) contacting 0.01-2 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof having a particle size of 30-500 nm with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt to obtain a mixture; (b) subjecting the mixture to a temperature of 100 to 200° C. in a closed system to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-1 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof having a particle size of 30-500 nm with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt to obtain a mixture; (b) subjecting the mixture to a temperature of 100 to 200° C. in a closed system to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-0.9 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof having a particle size of 30-500 nm with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt to obtain a mixture; (b) subjecting the mixture to a temperature of 100 to 200° C. in a closed system to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-0.5 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof having a particle size of 30-500 nm with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt to obtain a mixture; (b) subjecting the mixture to a temperature of 100 to 200° C. in a closed system to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-2 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a closed system to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-1 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a closed system to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-0.9 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a closed system to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-0.5 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a closed system to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-2 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-1 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-0.9 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-0.5 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-2 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture;

(b) subjecting the mixture to a temperature of 100 to 200° C. in a pressure tube for 0.5 to 2 h at a pressure in the range of 1.3 to 3 to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-1 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h at a pressure in the range of 1.3 to 3 to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-0.9 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h at a pressure in the range of 1.3 to 3 to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-0.5 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h at a pressure in the range of 1.3 to 3 to obtain a mixture of salts containing dispersed nanoparticles; and (c) removing water from the mixture of salts containing dispersed nanoparticles to obtain the composition.

In one implementation, the method for preparation of composition includes the steps of: (a) contacting 0.01-2 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h at a pressure in the range of 1.3 to 3 bars to obtain a mixture of salts containing dispersed nanoparticles; and (c) removing water from the mixture of salts containing dispersed nanoparticles to obtain the composition, wherein the mixture has a moisture content in the range 3 to 13 wt %.

In one implementation, the method for preparation of composition includes the steps of: (a) contacting 0.01-1 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h at a pressure in the range of 1.3 to 3 bars to obtain a mixture of salts containing dispersed nanoparticles; and (c) removing water from the mixture of salts containing dispersed nanoparticles to obtain the composition, wherein the mixture has a moisture content in the range 3 to 13 wt %.

In one implementation, the method for preparation of composition includes the steps of: (a) contacting 0.01-0.9 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h at a pressure in the range of 1.3 to 3 bars to obtain a mixture of salts containing dispersed nanoparticles; and (c) removing water from the mixture of salts containing dispersed nanoparticles to obtain the composition, wherein the mixture has a moisture content in the range 3 to 13 wt %.

In one implementation, the method for preparation of composition includes the steps of: (a) contacting 0.01-0.5 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h at a pressure in the range of 1.3 to 3 bars to obtain a mixture of salts containing dispersed nanoparticles; and (c) removing water from the mixture of salts containing dispersed nanoparticles to obtain the composition, wherein the mixture has a moisture content in the range 3 to 13 wt %.

In one implementation, the method for preparation of composition includes the steps of: (a) contacting 0.01-2 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h at a pressure in the range of 1.3 to 3 bars to obtain a mixture of salts containing dispersed nanoparticles; and (c) removing water from the mixture of salts containing dispersed nanoparticles to obtain the composition, wherein the mixture has a moisture content in the range 3 to 13 wt %, and wherein the mixture has a melting temperature in the range of 100 to 150° C.

In one implementation, the method for preparation of composition includes the steps of: (a) contacting 0.01-1 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h at a pressure in the range of 1.3 to 3 bars to obtain a mixture of salts containing dispersed nanoparticles; and (c) removing water from the mixture of salts containing dispersed nanoparticles to obtain the composition, wherein the mixture has a moisture content in the range 3 to 13 wt %, and wherein the mixture has a melting temperature in the range of 100 to 150° C.

In one implementation, the method for preparation of composition includes the steps of: (a) contacting 0.01-0.9 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h at a pressure in the range of 1.3 to 3 bars to obtain a mixture of salts containing dispersed nanoparticles; and (c) removing water from the mixture of salts containing dispersed nanoparticles to obtain the composition, wherein the mixture has a moisture content in the range 3 to 13 wt %, and wherein the mixture has a melting temperature in the range of 100 to 150° C.

In one implementation, the method for preparation of composition includes the steps of: (a) contacting 0.01-0.5 wt % at least one nanoparticle selected from the group consisting of molybdenum disulfide, cupric oxide, carbon nanotube, functionalized carbon nanotube, multi-walled carbon nanotube, activated carbon, activated carbon sphere, graphene, and combinations thereof with 60 to 70 wt % potassium nitrate and 5 to 20 wt % lithium nitrate and 10 to 35 wt % of a metal salt having water of crystallization selected from the group consisting of alkali metal salt, alkaline earth metal salt, and transition metal salt with a melting point in the range 40 to 120° C. to obtain a mixture; (b) subjecting the mixture to a temperature of 100 to 200° C. in a pressure tube for 0.5 to 2 h at a pressure in the range of 1.3 to 3 bars to obtain a mixture of salts containing dispersed nanoparticles; and (c) removing water from the mixture of salts containing dispersed nanoparticles to obtain the composition, wherein the mixture has a moisture content in the range 3 to 13 wt %, and wherein the mixture has a melting temperature in the range of 100 to 150° C.

EXAMPLES

The disclosure will now be illustrated with working examples, which is intended to illustrate the working of disclosure and not intended to take restrictively to imply any limitations on the scope of the present disclosure. Other examples are also possible which are within the scope of the present disclosure.

The melting points and enthalpies of compositions comprising of salt mixture and nanoparticles were measured using differential scanning calorimetry (DSC). Mass changes with respect to temperature in different gas atmospheres were measured using thermogravimetric analysis (TGA). Both DSC and TGA were determined simultaneously using NETZCH Simultaneous Thermal Analyzer STA 449 F3 Jupiter. The TGA-DSC analysis has been determined both in nitrogen atmosphere as well as air atmosphere.

Specific heat capacity was measured using DSC technique. For specific heat measurements three measurements have been done; first a correction run using empty crucibles, second using the first correction run, done the measurement using sapphire disc as standard, third the DSC measurement uses the sample. Finally, after the three measurements, the specific heat capacities of samples with respect to temperature have been measured using ratio method.

Thermal conductivity was determined by using transient plane source method and the instrument used was HOT-DISK TPS 2500 S thermal conductivity meter. The molten salt powder was put in a small metal cup (made up of non-corrosive Inconel) and placed with the HOT DISK sensor, named 5465 (radius 3.189 mm) in the furnace. The furnace was put on end, so that the furnace tube is vertical, not horizontal as commonly used. This way the sample could melt to liquid and still stay within the cup. The closed furnace was evacuated and filled with $N_2$ to protect from any air or moisture.

The temperature was then raised to 250° C., kept stable for a while, so that all materials melt. Then during the natural cooling of the furnace, when target temperature was set to RT, one reading at each 30 min interval was taken. This gave a series of measurements from 245° C. to 32° C. Each measurement was evaluated with temperature drift compensation, but since the cooling rate was so slow and steadily progressing, it did not cause any noise in the results. Thermal conductivities of HPHTF-A, HPHTF-A+0.5 wt % $MoS_2$ at 200° C. are 0.5063 and 0.5921 W/mK respectively.

Example 1

Synthesis of Nanoparticles

The $MoS_2$ nanoparticles were synthesized as described in the literature (Yumei Tian et al., Materials Letters, 2006, 60 527-529) and CuO nanoparticles were synthesized as described by R. Etefagh et al. (Scientia Iranica, Transactions F: Nanotechnology, 2013, 20, 1055-1058). Activated charcoal was purchased from MERCK and activated carbon spheres also collected from commercial sources. Carbon nanotubes were received from commercial sources and acid functionalization has been done as follows. In a 500 mL round bottom flask, 500 mg of multi-walled CNT was taken and 150 mL of a mixture of concentrated $H_2SO_4$ and concentrated $HNO_3$ (3:1 ratio) was added and sonicated for 6 h at 70° C. After the reaction the reaction mixture was diluted by distilled water and filtered. The filter cake is dried at 120° C. overnight to get acid-functionalized CNT.

Synthesis of the Composition Comprising of Molten Salt Mixture and Dispersed Nanoparticles Metals salts, such as $KNO_3$, (60 to 70 Wt %), $LiNO_3$ (5 to 20 Wt %), the hydrated salt (10 to 30 Wt %), and nanoparticles (0.01 to 2 wt %) were weighed according to the composition provided in Table 1 and mixed in a pressure tube with magnetic pellet to form a mixture of salts containing uniformly dispersed nanoparticles. The pressure tube was tightened with Teflon screw, and heated at 200° C. and stirred using a magnetic stirrer associated with in-built oil bath. After evolution of hydrated water, the salts were dissolved internally and the nanoparticles were dispersed uniformly in the mixture. The solution was thoroughly mixed and kept at 200° C. for 2 hours and then the pressure was released by opening the tube and water removed using rotary evaporator. The pressure inside the tube was measured using pressure gauge found to be in the range of 1.2 to 3 bar. The melting points of the compositions are provided in Table 1 and are below 150° C. The water content of the whole mixture can be calculated using TGA analysis. The moisture content of the composition was found to be in the range of 3 to 13 wt %.

position of the present disclosure, nanoparticles tend to form clusters in the molten salt mixture as seen in FIGS. 1(B) and 1(C).

Figure 2:
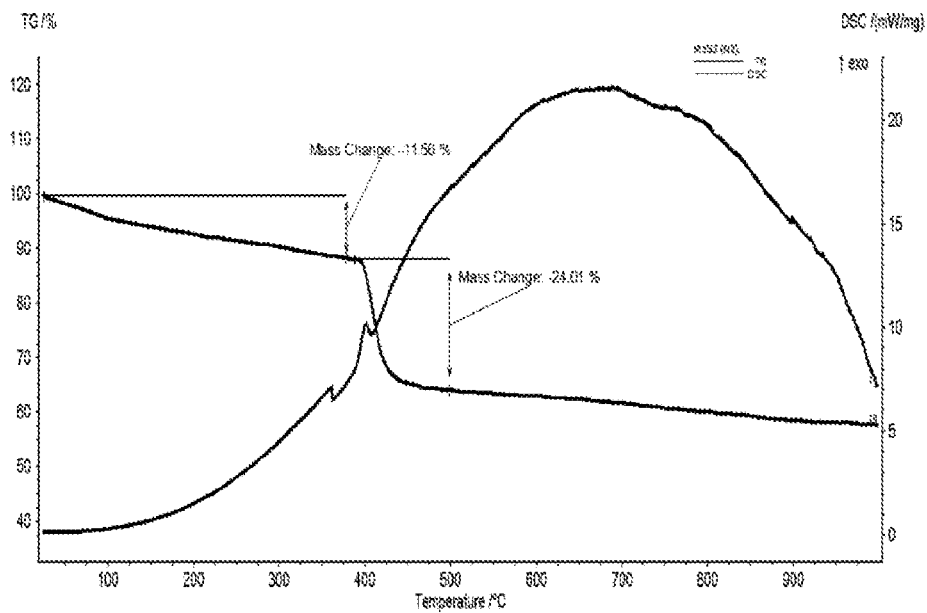
FIG. 2 depicts thermogravimetric curve analysis (TGA) and differential scanning calorimetry (DSC) of $MoS_2$ nanoparticle under nitrogen atmosphere.

FIG. 2 shows TGA and DSC of $MoS_2$ nanoparticle under Nitrogen atmosphere. The $MoS_2$ nanoparticles were heated from RT to 1000° C. at a heating rate of 10° C./min, nitrogen purge flow was 80 mL/min. $MoS_2$ nanoparticles used for adding to the molten salt mixture are stable up to 400° C.

Figure 3:
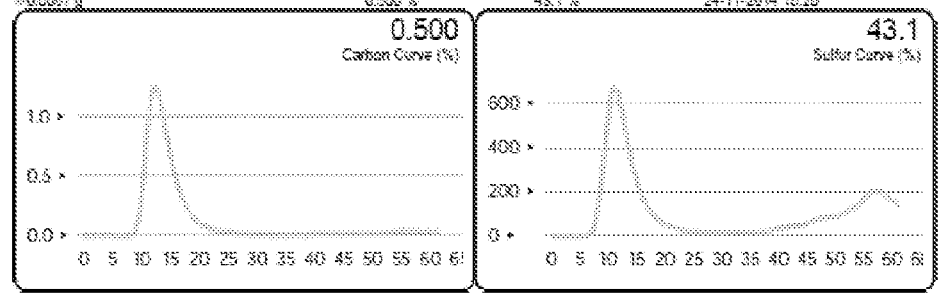
FIG. 3 depicts carbon-sulfur analysis plot of synthesized molybdenum disulfide ($MoS_2$) nanoparticles.

FIG. 3 shows carbon-sulfur analysis plot of synthesized $MoS_2$ nanoparticles. Molecular weight of $MoS_2$ is 160 and that of Sulfur is 32. So theoretical value of Sulfur content is 40% and obtained value is 43%, which indicates that the $MoS_2$ nanoparticles have been successfully synthesized.

Figure 4:
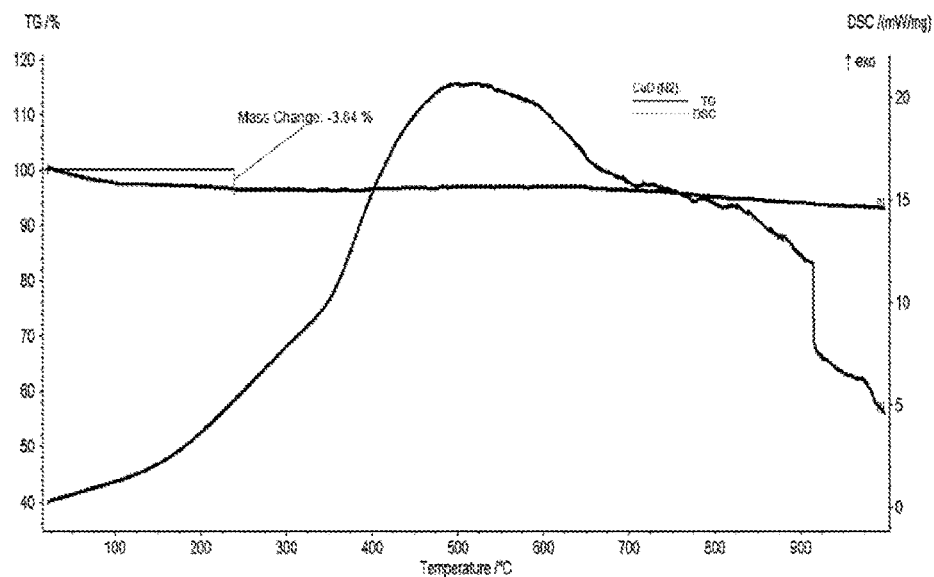
FIG. 4 depicts TGA and DSC of Cupric oxide (CuO) nanoparticle under nitrogen atmosphere.

FIG. 4 shows TGA and DSC of CuO nanoparticle under Nitrogen atmosphere. The CuO nanoparticles were heated from RT to 1000° C. at a heating rate of 10° C./min, nitrogen purge flow was 80 mL/min CuO nanoparticles used for adding to the molten salt mixture are stable up to 400° C.

Figure 5:
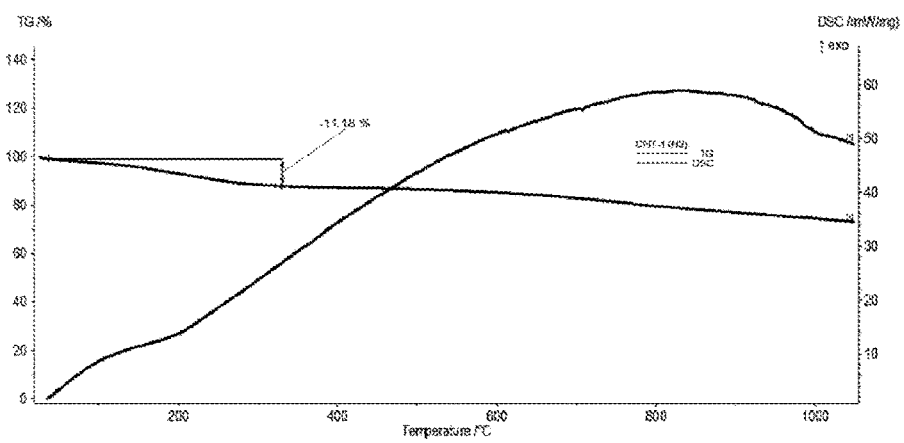
FIG. 5 depicts TGA and DSC of carbon nanotube (CNT) nanoparticle under nitrogen atmosphere.

FIG. 5 shows TGA and DSC of carbon nanotube (CNT) nanoparticle under Nitrogen atmosphere. The CuO nanoparticles were heated from RT to 1000° C. at a heating rate of 10° C./min, nitrogen purge flow was 80 mL/min. CNT nanoparticles used for adding to the molten salt mixture are stable up to 450° C.

Figure 6:
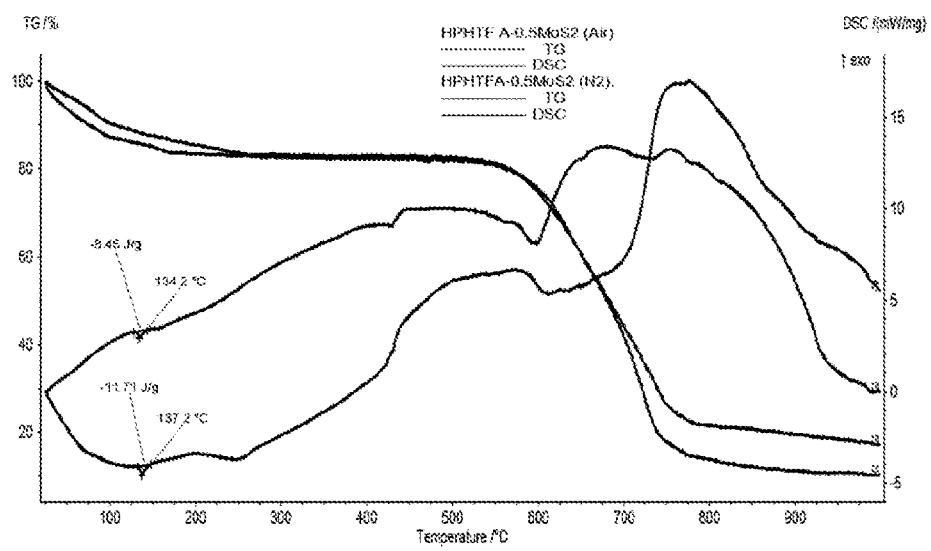
FIG. 6 depicts TGA and DSC of HPHTF-A+0.5 wt % $MoS_2$ under nitrogen atmosphere and Air atmosphere.

FIG. 6 shows TGA and DSC of HPHTF-A+0.5 wt % $MoS_2$ under Nitrogen atmosphere and Air atmosphere. The aforementioned sample was heated from RT to 1000° C. at a heating rate of 10° C./min; nitrogen/air purge flow was 80 mL/min. TGA in different atmospheres ($N_2$ and Air) showed that the sample is thermally stable up to 560° C. Endothermic peaks at 134.2, and 137.2° C. denotes the melting points of HPHTF-A+0.5 wt % $MoS_2$ in air and nitrogen atmosphere respectively. Melting point of pure HPHTF-A was 137° C. which got increased to 137.2° C. the in nitrogen atmosphere after addition of nanoparticle (0.5 wt % $MoS_2$).

Figure 7:
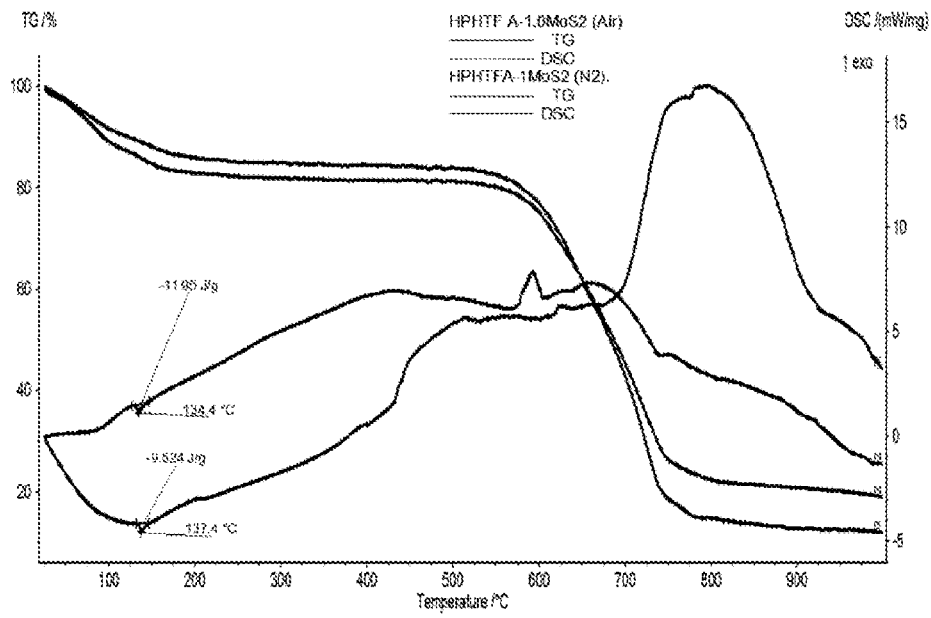
FIG. 7 depicts TGA and DSC of HPHTF-A+1.0 wt % $MoS_2$ under nitrogen atmosphere and Air atmosphere.

FIG. 7 shows TGA and DSC of HPHTF-A+1.0 wt % $MoS_2$ under Nitrogen atmosphere and Air atmosphere. The aforementioned sample was heated from RT to 1000° C. at a heating rate of 10° C./min; nitrogen/air purge flow was 80 mL/min TGA in different atmospheres ($N_2$ and Air) showed

TABLE 1

Compositions comprising salt mixture and dispersed nanoparticles

| Materials | Salts in pressure tube | Wt ratio of salts | Wt ratio of nanoparticles | Particle size of nanoparticles (nm) | Melting point of Compositions (° C.) |
|---|---|---|---|---|---|
| HPHTF-A + $MoS_2$ nanoparticles | $KNO_3:Ca(NO_3)_2 \cdot 4H_2O:LiNO_3$ | 66.6:18.9:13.9 | 0.49 | 200 | 137.2 |
| HPHTF-A + 1.0 $MoS_2$ | $KNO_3:Ca(NO_3)_2 \cdot 4H_2O:LiNO_3$ | 66.3:18.8:13.8 | 0.99 | 200 | 137.4 |
| HPHTF-A + 2.0 $MoS_2$ | $KNO_3:Ca(NO_3)_2 \cdot 4H_2O:LiNO_3$ | 65.6:18.6:13.7 | 1.96 | 200 | 135.9 |

FIG. 1 shows scanning electron microscopy (SEM) images of HPHTF-A and nanoparticle incorporated salt in different compositions (A) Pure HPHTF-A, (B) HPHTF-A+ 0.5 wt % $MoS_2$, (C) HPHTF-A+1.0 wt % $MoS_2$, (D) HPHTF-A+2.0 wt % $MoS_2$. SEM images were taken using ZEISS FE-SEM Sigma instrument. As seen in FIG. 1(A), nanoparticles are uniformly dispersed in molten salt mixture and less agglomeration is observed when 0.5 wt % of nanoparticles is used in the composition. However, when weight percentage of nanoparticles is increased in the comthat the sample is thermally stable up to 560° C. Endothermic peaks at 134.4, and 137.4° C. denotes the melting points of HPHTF-A+1.0 wt % $MoS_2$ in air and nitrogen atmosphere respectively. Melting point of pure HPHTF-A was 137° C. which got increased to 137.4° C. the in nitrogen atmosphere after addition of nanoparticle (1.0 wt % $MoS_2$).

Figure 8:
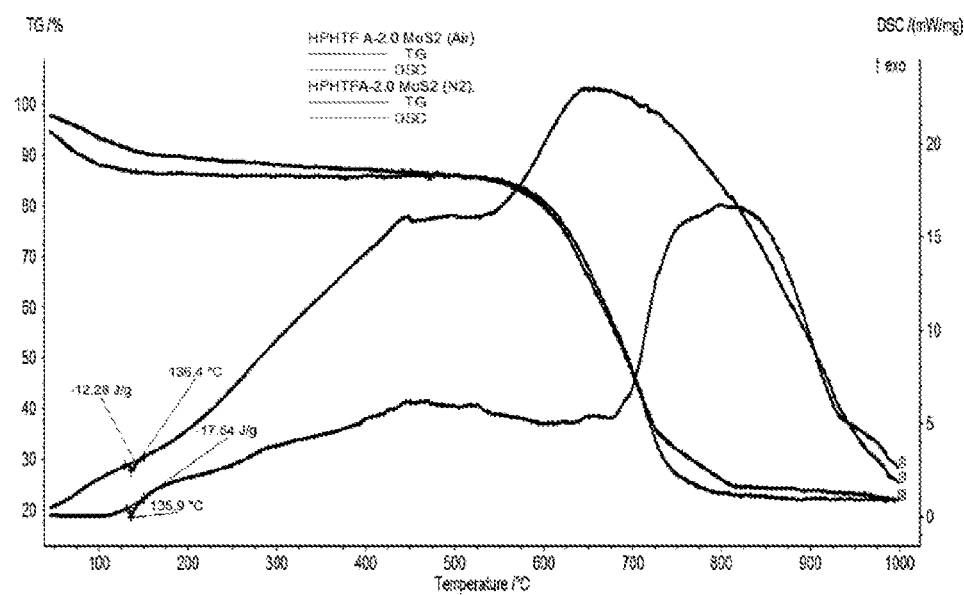
FIG. 8 depicts TGA and DSC of HPHTF-A+2.0 wt % $MoS_2$ under nitrogen atmosphere and Air atmosphere.

FIG. 8 shows TGA and DSC of HPHTF-A+2.0 wt % $MoS_2$ under Nitrogen atmosphere and Air atmosphere. The aforementioned sample was heated from RT to 1000° C. at a heating rate of 10° C./min; nitrogen/air purge flow was 80 mL/min. TGA in different atmospheres ($N_2$ and Air) showed that the sample is thermally stable up to 560° C. Endothermic peaks at 136.4, and 135.9° C. denotes the melting points of HPHTF-A+2.0 wt % $MoS_2$ in air and nitrogen atmosphere respectively. Melting point of pure HPHTF-A was 137° C. which got decreased to 135.9° C. the in nitrogen atmosphere after addition of nanoparticle (2.0 wt % $MoS_2$).

TABLE 2

Characteristics of compositions of the present disclosure.

| Materials | Melting Point (° C.) | Enthalpy (J/g) | Thermal Stability (° C.) | Cp (kJ/kgK) @ RT | Cp (kJ/kgK) @ 200° C. | Cp (kJ/kgK) @ 300° C. |
|---|---|---|---|---|---|---|
| HPHTF-A | 137.0 | 5.01 | ~550 | 1.761 | 1.644 | 2.084 |
| HPHTF-A + 0.5 $MoS_2$ | 137.2 | 10.67 | ~560 | 2.159 | 1.672 | 2.385 |
| HPHTF-A + 1.0 $MoS_2$ | 137.4 | 11.64 | ~560 | 1.599 | 0.668 | 0.568 |
| HPHTF-A + 2.0 $MoS_2$ | 135.9 | 11.80 | ~560 | 0.961 | 0.205 | 0.865 |

Table 2 shows the melting point, enthalpy of fusion, thermal stability and specific heat capacity. Specific heat capacity is measured at room temperature, at 200° C. and at 300° C. Melting point of HPHTF-A, HPHTF-A+0.5 wt % $MoS_2$, HPHTF-A+1.0 wt % $MoS_2$ and HPHTF-A+2.0 wt % $MoS_2$ is 137, 137.2, 137.4 and 135.9° C. and the enthalpy of fusion is 5.01, 10.67, 11.64 and 11.80 respectively. The salts were found to be thermally stable and can be used safely around 560° C. without any degradation. The specific heat capacity (Cp) values of HPHTF-A+0.5% $MoS_2$ are 2.159, 1.672 and 2.385 kJ/kgK at room temperature (RT), at 200° C., and at 300° C. respectively which is higher than the Cp values of HPHTF-A, HPHTF-A+1.0 wt % $MoS_2$ and HPHTF-A+2.0 wt % $MoS_2$ given in Table 2.

Further, thermal conductivity of HPHTF-A+0.5 wt % $MoS_2$ is found to be more than that of pure HPHTF-A. Thermal conductivity of pure HPHTF-A is 0.5063 W/mK at 200° C. and that of HPHTF-A+0.5 wt % $MoS_2$ sample is 0.5921 W/mK at 200° C.

From the above data it can be inferred that these compositions may act as more efficient solar thermal energy storage material than the molten salt mixture alone.

Advantages Gained in the Example Illustrative Process in this Subject Matter

Molten salt based thermal energy storage received much attention due to the availability and low cost of molten salt, high thermal stability and thermal conductivity compared to the organic based thermal storage fluids, low viscosity at high temperature etc. However, molten salts are relatively limited in terms of their thermal energy storage capacity. The addition of nanoparticles improves the thermal conductivity, thermal stability, specific heat capacity without sacrificing the heat of fusion to a large extent. The present disclosure provides a one-pot synthesis which is easy and cost effective where nanoparticles and salt mixtures in such a way that one of the salts is hydrated taken in a pressure tube and stirred at 200° for 2 h. After that remove the water under reduced pressure and the nanoparticle incorporated salt can be used directly for heat storage as well as heat transfer applications. The nano-molten salts obtained after optimization of nanoparticle content showed better thermal conductivity and better specific heat capacity compared to original molten salt.

Although the subject matter has been described in considerable detail with reference to certain examples and implementations thereof, other implementations are possible. As such, the spirit and scope of the appended claims should not be limited to the description of the preferred examples and implementations contained therein.

We claim:

1. A method for preparation of a composition, the method comprising:
   a) forming a solid mixture by contacting at least one nanoparticle with at least one alkali metal salt and a metal salt having water of crystallization, wherein the at least one nanoparticle is selected from the group consisting of molybdenum disulfide, activated carbon, activated carbon sphere, and combinations thereof, the at least one nanoparticle having a particle size that is greater than 30 nm and no more than 500 nm;
   b) subjecting the solid mixture to a temperature in the range of 100 to 200° C. in a closed system to obtain dispersed nanoparticles in a mixture of salts;
   c) reducing the pressure in the closed system to a reduced pressure; and
   d) removing at least some water from the dispersed nanoparticles in the mixture of salts at the reduced pressure to obtain the composition.

2. The method as claimed in claim 1, wherein the at least one nanoparticle weight percentage in the composition is in the range of 0.01 to 2%.

3. The method as claimed in claim 1, wherein the at least one alkali metal salt is selected from the group consisting of sodium metal salt, lithium metal salt, potassium metal salt, and combinations thereof, wherein the at least one alkali metal salt is inorganic anions.

4. The method as claimed in claim 1, wherein the at least one alkali metal salt weight percentage in the composition is in the range of 5 to 90%.

5. The method as claimed in claim 1, wherein the at least one alkali metal salt is a combination of lithium and potassium nitrate, wherein the potassium nitrate weight percentage in the composition is in the range of 60 to 70% and the lithium nitrate weight percentage in the composition is in the range of 5 to 20%.

6. The method as claimed in claim 1, wherein the metal salt having water of crystallization is selected from the group consisting of alkali metal salt, alkaline earth metal salt, and transition metal salt.

7. The method as claimed in claim 1, wherein the metal salt having water of crystallization has melting point in the range 40 to 120° C.

8. The method as claimed in claim 1, wherein the metal salt having water of crystallization weight percentage in the composition is in the range of 10 to 35%.

9. The method as claimed in claim 1, wherein the metal salt having water of crystallization is hydrated calcium nitrate.

10. The method as claimed in claim 1, wherein the composition has moisture content in the range 3 to 13%, and has a melting temperature in the range of 100 to 150° C.

11. The method as claimed in claim 1, wherein the mixture of salts containing dispersed nanoparticles is subjected to the temperature of 100 to 200° C. for 0.5 to 2 hours.

12. A composition comprising (a) at least one nanoparticle selected from the group consisting of molybdenum disulfide, activated carbon, activated carbon sphere, and combinations thereof the at least one nanoparticle having a particle size ranging from 30 nm to 500 nm, (b) at least one alkali metal salt, and (c) a metal salt having water of crystallization, wherein the composition has a melting temperature in the range of 100 to 150° C.

13. The composition as claimed in claim 12, wherein the at least one nanoparticle weight percentage in the composition is in the range of 0.01 to 2%.

14. The composition as claimed in claim 12, wherein the at least one alkali metal salt is a combination of lithium and potassium nitrate, wherein the potassium nitrate weight percentage in the composition is in the range of 60 to 70% and the lithium nitrate weight percentage in the composition is in the range of 5 to 20%.

15. The composition as claimed in claim 12, wherein the metal salt having water of crystallization weight percentage in the composition is in the range of 10 to 35%.

16. The composition as claimed in claim 12, wherein the metal salt having water of crystallization is hydrated calcium nitrate.

17. The composition as claimed in claim 12, for use in solar thermal energy storage.

18. The method as claimed in claim 1, wherein the at least one nanoparticle is molybdenum disulfide.

* * * * *